United States Patent [19]

Sagawa et al.

[11] Patent Number: 5,356,971
[45] Date of Patent: Oct. 18, 1994

[54] THERMOSETTING POWDER COATING MATERIAL

[75] Inventors: Chiaki Sagawa, Tokyo; Manabu Katagiri, Yokohama, both of Japan; Toru Kurashina, Petaling Jaya Selango Darul Ehsan, Malaysia

[73] Assignee: NOF Corporation, Japan

[21] Appl. No.: 84,060

[22] Filed: Jun. 28, 1993

Related U.S. Application Data

[63] Continuation-in-part of Ser. No. 959,579, Oct. 13, 1992, Pat. No. 5,223,562.

[30] Foreign Application Priority Data

Oct. 11, 1991 [JP] Japan .................. 3-292367
Aug. 10, 1992 [JP] Japan .................. 4-234191

[51] Int. Cl.$^5$ .................. C08L 91/06; C08L 27/12
[52] U.S. Cl. .................. 524/275; 524/277; 524/474; 524/487; 524/544; 524/904; 524/520
[58] Field of Search .............. 524/275, 276, 277, 478, 524/479, 480, 487, 488, 489, 520, 544, 545, 546, 763, 904, 474

[56] References Cited

U.S. PATENT DOCUMENTS

| | | | |
|---|---|---|---|
| 3,920,620 | 11/1975 | Ceccato et al. | 525/326.3 |
| 4,065,419 | 12/1977 | Kawaguch et al. | 524/275 |
| 4,166,165 | 8/1979 | Hisasue et al. | 526/87 |
| 4,250,278 | 2/1981 | Suzuki et al. | 524/544 |
| 4,345,057 | 8/1982 | Yamabe et al. | 526/247 |
| 4,640,966 | 2/1987 | Mitani et al. | 526/249 |
| 4,645,799 | 2/1987 | Wachi et al. | 525/199 |
| 4,690,968 | 9/1987 | Mitani et al. | 524/544 |
| 4,762,891 | 8/1988 | Albin et al. | 525/276 |
| 4,983,680 | 1/1991 | Ojakaar | 525/281 |
| 5,130,365 | 7/1992 | Koishi et al. | 524/520 |

FOREIGN PATENT DOCUMENTS

| | | | |
|---|---|---|---|
| 0219372 | 12/1984 | Japan | 524/544 |
| 0018317 | 1/1985 | Japan | 524/544 |
| 0243378 | 10/1988 | Japan | 524/277 |

OTHER PUBLICATIONS

Smarsh, Joseph, "Powder Coating: Why—How—When", *Journal of Paint Technology*, vol. 44, No. 565, Feb. 1972.

*Primary Examiner*—Peter Szekely

[57] ABSTRACT

A thermosetting powder coating composition which contains a resin composition containing (a) 60 to 97 weight % of a fluororesin having reactive group for crosslinking in the molecule which contains 10 weight % or more of fluorine and has glass transition temperature in the range from 35° to 120° C., (b) 3 to 40 weight % of a hardener which can form crosslinking by reaction with the reactive group for crosslinking in the fluororesin (a), (c) 0.01 to 10 weight parts of a synthetic wax or a natural wax based on 100 weight parts of the resin composition and (d) 0.001 to 1.0 weight parts of a material as a coupling agent based on 100 weight parts of the resin composition, forms a coating layer which has the same degree of water repellency and slipping property as those formed from polytetrafluoroethylene powder while the excellent weatherability, acid resistance and adhesion to substrates are retained. A coating layer having excellent adhesive property and impact resistance can be formed therewith on a stainless steel substrate without chemical pretreatment or coating with a primer.

16 Claims, No Drawings

THERMOSETTING POWDER COATING MATERIAL

This application is a continuation-in-part application of application Ser. No. 07/959,579 filed Oct. 13, 1992, now U.S. Pat. No. 5,223,562.

BACKGROUND OF THE INVENTION

1. Field of the Invention

The present invention relates to a novel thermosetting powder coating material which forms coatings having improved slipping property and water repellency by compounding a synthetic wax or natural wax with a fluororesin powder coating material having a reactive group for crosslinking in the molecule, which coatings have excellent adhesion property to substrates, particularly to stainless steel, and excellent impact resistance imparted thereto by a compound having a coupling group compounded in it.

2. Description of the Prior Art

Application of thermoplastic flouroresin powders comprising tetrafluoroethylene resins to various areas has been proposed and practical applications, have been made to adhesion-free applications such as coating of frying pans and rice cookers, by taking advantage of the low surface tension of flouroresins (Laid Open Japanese Patent Applications Showa 61-181567, Showa 61-151571 and Showa 61-181572).

However, the applications described above have problems, e.g., melt coating of the resin requires a high temperature of around 400° C. and adhesion to substrates is not satisfactory.

A thermosetting flouroresin powder coating material was developed for solving these problems (Laid Open Japanese Patent Application Heisei 1-103670).

This thermosetting flouroresin powder coating material can form a coating layer by baking at a temperature of 200° C. or lower and the coating has good weatherability and acid resistance as well as good adhesion to substrates other than stainless steel in comparison with tetrafluoroethylene resins which had been known before. This material has been widely used for these reasons. However, this material has drawbacks, viz., water repellency and slipping property of a coating layer, which are advantages of flouroresins in general, are inferior to a great extent because it contains less fluorine than conventional flouroresin powders containing tetrafluoroethylene resins and it does not have sufficient adhesion to stainless steel.

Because of these drawbacks, treatment of coating with colored chemicals, such as chromate treatment, or coating with a primer having good adhesion to substrates, such as an epoxy resin coating material, was necessary when the material described above is used to coat a substrate like stainless steel. When a chromium oxide treating agent is used for the clear coating with the flouroresin power coating material, problems of coloring caused by the treating agent and treatment of waste water containing chromium oxide compounds arise. When the primer coating is applied, another problem arises, viz., separation tends to occur between the primer coating layer and the finished flouroresin coating layer because weatherability of the primer coating layer is inferior to the flouroresin coating layer. For this reason, a flouroresin powder coating exhibiting a high grade of clearness which takes full advantage of the quality of a substrate material is not easily attained. Furthermore, even in colored coating using the flouroresin powder coating materials, the chromium oxide coating treatment or the primer coating treatment is necessary and the process of the coating tends to be complicated.

SUMMARY OF THE INVENTION

The present invention accordingly has an object to provide a thermosetting flouroresin powder coating composition which can form coating layer under a baking condition of 200° C. or lower, has excellent weatherability, acid resistance and adhesion to substrates including stainless steel and forms coating which have the same degree of water repellency and slipping property as those of thermoplastic flouroresin powders.

Extensive investigations undertaken by the present inventors with the objects described above lead to a discovery that the water repellency and the slipping property of a coating layer can be remarkably improved without having an adverse effect on the weatherability, the acid resistance adhesive property to substrates like stainless steel substrate is remarkably improved as well by compounding (c) a synthetic wax or a natural wax and (d) a compound having a coupling group to a resin composition comprising (a) a specific flouroresin having reactive group for crosslinking in the molecule and (b) a hardener. The present invention has been completed on the basis of the discovery.

Thus, in one aspect this invention relates to a thermosetting powder coating composition comprising a resin composition containing (a) 60 to 97 weight % of a flouroresin having reactive group for crosslinking in the molecule which contains 10 weight % or more of fluorine and has glass transition temperature in the range from 35° to 120° C. or a mixture of 99 to 50 weight % of the fluororesin and to 50 wt. % based on the weight of the mixture, of a thermoplastic resin or a resin having a reactive group, (b) 3 to 40 weight % of a hardener which can form crosslinking by reaction with the reactive group for crosslinking in the flouroresin (a), (c) 0.01 to 10 weight parts of a synthetic wax or a natural wax based on 100 weight parts of the resin composition and (d) 0.001 to 1.0 weight parts of a material as a coupling agent based on 100 weight parts of the resin composition.

Other and further objects, features and advantages of the invention will appear more fully from the following description.

DETAILED DESCRIPTION OF THE INVENTION

The present invention is described in more detail in the following.

In the present invention, water repellency and slipping property of a coating layer are improved remarkably without adverse effect on the other properties thereof, such as weatherability, acid resistance, adhesive property and the like and adhesive property to stainless steel substrate and impact resistance are remarkably improved as well by compounding specific amounts of a resin composition containing (a) a specific flouroresin having a reactive group for crosslinking in the molecule and (b) a hardener, (c) synthetic wax or natural wax and (d) a material as a coupling agent.

The synthetic wax or the natural wax (c) utilized in the invention preferably has a melting point in the range from 50° to 280° C. Natural waxes, such as plant waxes, animal waxes and mineral waxes, or synthetic waxes may be utilized as the wax of the invention. When the melting point of the wax utilized in the invention is lower than 50° C., powder particles tend to coalesce during the application process for the powder coating. When the melting point is higher than 280° C., the powder coating composition does not melt during the period for the formation of the coating layer, resulting in insufficient water repellency and slipping property of a coating layer formed from the composition.

The wax (c) preferably has a melting point suitable for melting during the formation of the coating layer. Because the temperature of the formation of the coating layer is different according to application, preferably the melting point of the wax is lower than the temperature of the formation of coating layer by 10° to 20° C. For example, when the coating layer is formed by baking at 180° C., the melting point of the wax is more preferably in the range from 160° to 170° C.

The type of wax (c) utilized in the invention is not particularly limited so long as the wax can be dispersed and mixed homogeneously during the preparation process of the powder coating material. Waxes of solid bulk form, flake form, powder form and other forms may be utilized.

Examples of the natural wax are montan wax, carnauba wax, beeswax, shellac wax, paraffin wax, ceresine, Japan wax and the like. Examples of the synthetic wax are reaction products of long chain alcohols having 16 to 36 carbon atoms, such as cetyl alcohol, palmityl alcohol, stearyl alcohol and the like, with acids, such as stearic acid, palmitic acid, myristic acid and the like, glycerides of fatty acids, such as stearic acid and the like, ester of glycols, polyethylene glycols and the like with fatty acids, such as stearic acid and the like, synthetic beeswaxes, such as aliphatic amine waxes obtained by the reaction of hydrogenated castor oil and monoethanolamine, high molecular weight aliphatic amides and the like, and the like synthetic waxes.

Preferable examples of the wax (c) in the invention are polyamide wax, fluoropolyolefin wax, aliphatic ester wax and beeswax. The more preferable example among them is unsubstituted polyolefin wax.

When the amount of the synthetic wax or the natural wax used in the composition of the present invention is less than 0.01 weight parts, the effect of the wax is not exhibited. When the amount is more than 10 weight parts, the appearance of the coated layer by the powder coating material is inferior and adhesion to the substrate is decreased.

The coupling agent (d) used in the invention is a silane coupling agent or other coupling agent such as a titanium coupling agent, an aluminum coupling agent, a zirconium coupling agent and the like comprising alkoxy groups, respectively.

Examples of the silane coupling agent are compounds expressed by the general formula:

YSiX$_n$R$_{3-n}$ wherein R is a hydrogen, atom, methyl group or ethyl group, X is methoxy group, ethoxy group or β-methoxyethoxy group, n is 1, 2 or 3 and Y is vinyl group; an alkyl group comprising an olefin, such as methacryloxymethyl group, methacryloxypropyl group and the like; an alkyl group comprising an epoxy group, such as β-(3,4-epoxycyclohexyl)ethyl group, γ-glycidoxypropyl group and the like; an alkyl group comprising an amino group, such as γ-aminopropyl group, N-(2-aminoethyl)-γ-aminopropyl group, N-phenyl-γ-aminopropyl group and the like; or an alkyl group comprising a chlorine atom, such as chloromethyl group, γ-chloropropyl group and the like. More specific examples of the silane coupling agent are: vinyltrimethoxysilane, vinyltriethoxysilane, vinyltributoxysilane, vinyltris(β-methoxyethoxy)silane, γ-(meth)acryloxypropyltrimethoxysilane, γ-glycidoxypropyltrimethoxysilane, γ-glycidoxypropylmethyldiethoxysilane, β-(3,4-epoxycylclohexyl)ethyltrimethoxysilane, γ-aminopropyltriethoxysilane and the like. Commercial silane coupling agents can be used as well.

Examples of titanium coupling agents are: isopropyl trioctanoyl titanate, isopropyl diisostearoyl cumylphenyl titanate, isopropyl distearoyl methacryl titanate, isopropyl tridodecylbenzenesulfonyl titanate, isopropyl diisostearoyl acryl titanate, isopropyl isostearoyl diacryl titanate, isopropyl (dioctyl phosphate) titanate, isopropyl tri-n-stearoyl titanate, isopropyl 4-aminobenzenesulfonyl di(dodecylbenzenesulfonyl) titanate, isopropyl tricumylphenyl titanate, isopropyl di(4-aminobenzoyl) isostearoyl titanate, isopropyl tri(dioctyl pyrophosphate) titanate, isopropyl tri(octyl butyl pyrophosphate) titanate, tetraisopropyl di(dilauryl phosphite)titanate, tetraoctyl di(ditridecyl phosphite) titanate, tetraisopropyl di(ditridecyl phosphite) titanate, tetra(2,2-diallylozymethyl-1-butoxy) di(ditridecyl) phosphite titanate, diisostrearoyloxyacetate titanate, isostearoyl methacryloxy acetate titanate, isostearoyl acryloxy acetate titanate, di(octyl phosphate)oxy acetate titanate, 4-aminobenzoyl isostearoyloxy acetate titanate, di(dioctyl pyrophosphate)oxy acetate titanate, di(octyl butyl pyrophosphate)oxy acetate titanate, diisostearoyl ethylene titanate, isostearoyl methacryl ethylene titanate, di(dioctyl phosphate) ethylene titanate, 4-aminobenzoyl isostearoyl ethylene titanate, di(dioctyl pyrophosphate) ethylene titanate, isopropyl dimethacryloyl isostearoyl titanate, isopropyl triisostearoyl titanate, tetraisopropoxy titanium and the like. Commercial titanium coupling agents can be used as well.

Examples of aluminum coupling agents are: aluminum isopropoxide, acetoalkoxyaluminum diisopropylate and the like. Commercial aluminum coupling agents can be used as well.

Examples of zirconium coupling agents are: isopropyl trioctanoyl zirconate, isopropyl diisostearoyl cumylphenyl zirconate, isopropyl distearoyl methacryl zirconate, isopropyl tridodecylbenzenesulfonyl zirconate, isopropyl diisostearoyl acryl zirconate, isopropyl isostearoyl diacryl zirconate, isopropyl (dioctyl phosphate) zirconate, isopropyl tri-n-stearoyl zirconate, isopropyl 4-aminobenzenesulfonyl di(dodecylbenzenesulfonyl) zirconate, isopropyl tricumylphenyl zirconate, isopropyl di(4-aminobenzoyl) isostearoyl zirconate, isopropyl tri(dioctyl pyrophosphate) zirconate, isopropyl tri(octyl butyl pyrophosphate) zirconate, tetraisopropyl di(dilauryl phosphite) zirconate, tetraoctyl di(ditridecyl phosphite)zirconate, tetraisopropyl di(ditridecyl phosphite) zirconate, tetra(2,2-diallyloxymethyl-1-butoxy) di(ditridecyl) phosphite zirconate, diisostearoyloxy acetate zirconate, isostearoyl methacryloxy acetate zirconate, isostearoyl acryloxyacetate zirconate, di(dioctyl phosphate)oxy acetate zirconate, 4-aminobenzoyl isostearoyloxy acetate zirconate, di(dioctyl pyrophosphate)oxy acetate zirconate, di(octylbutyl pyrophosphate)oxy acetate zirconate, diisostearoyl ethylene zirconate, isostearoyl methacryl ethylene zirconate, di(dioctyl phosphate) ethylene zirconate, 4-aminobenzoyl isostearoyl ethylene zirconate, di(dioctyl pyrophosphate) ethylene zirconate, isopropyl dimethacryl isostearoyl zirconate, isopropyl triisostrearoyl zirconate, tetraisopropoxy zirconium and the like. Commercial zirconium coupling agents can be used as well. The coupling agents may be used singly or as a combination of two or more kinds.

As described above, thermosetting flouroresin powder coating compositions having excellent weatherability, acid resistance and adhesion to stainless steel substrates as well as excellent impact resistance can be obtained employing 0.01 to 1.0 weight parts of the coupling agent (d) based on 100 weight parts of the resin composition containing the flouroresin (a) and the hardening agent (b) in the thermosetting powder coating compositions of flouroresins.

When the amount of the coupling agent compounded in the composition of the invention is less than 0.001 weight parts, sufficient improvement of the adhesive property is not attained. When the amount is more than 1.0 weight %, appearance of the coating layer is inferior and the impact strength of the coating layer is decreased.

It is necessary that the flouroresin of component (a) having reactive group for crosslinking used in the invention contains 10 weight % or more of fluorine and has a glass transition temperature in the range from 35° to 120° C.

The flouroresin (a) comprises fluoroolefin units and units having a reactive group for crosslinking. Examples of the fluoroolefin unit are units derived from fluoroolefins, such as tetrafluoroethylene, chlorotrifluoroethylene, trifluoroethylene, vinylidene fluoride, hexafluoropropylene, pentafluoropropylene and the like. The kind of the fluoroolefin unit can be suitably selected according to the properties required for the coating layer, the other components in the copolymer used in combination and the hardener used in combination. A flouroresin having a single kind of the fluoroolefin unit or a combination of two or more kinds of the fluoroolefin units may be utilized.

The reactive group for crosslinking in the molecule of the flouroresin is hydroxyl group, carboxyl group, glycidyl group, amide group, amino group, mercapto group, isocyanate group or an active halogen atom, such as bromine and iodine and preferably is a hydroxyl group, carboxyl group or glycidyl group.

The reactive group for crosslinking can be introduced into the flouroresin by the method of copolymerization of a fluoroolefin and a monomer having the reactive group for crosslinking, by the method of copolymerization of a fluoroolefin and a monomer having a substituent forming the reactive group for crosslinking by decomposition, followed by partial decomposition of the copolymer thus prepared and by the method of copolymerization of a fluoroolefin and a monomer having a functional group which is reactive with a compound giving the reactive group for crosslinking, followed by the reaction of the copolymer thus prepared with the compound providing the reactive group for crosslinking.

As the monomer having a hydroxyl group for crosslinking, a monomer having hydroxyl group or a group which can be converted into hydroxyl group and a double bond copolymerizable with the fluoroolefins described above can be utilized. Examples of such a monomer having hydroxyl group for crosslinking are: hydroxyalkyl vinyl ethers, such as hydroxyethyl vinyl ether, hydroxypropyl vinyl ether, hydroxybutyl vinyl ether, hydroxyisobutyl vinyl ether, hydroxycyclohexyl vinyl ether and the like; esters of hydroxyalkyl carboxylic acids and vinyl alcohol, such as vinyl hydroxyacetate, vinyl hydroxypropionate, vinyl hydroxylactate, vinyl hydroxyvalerate, vinyl hydroxyisolactate, vinyl hydroxycyclohexanecarboxylate and the like; hydroxyalkyl allyl ethers, such as hydroxyethyl allyl ether, hydroxypropyl allyl ether, hydroxybutyl allyl ether, hydroxyisobutyl allyl ether, hydroxycyclohexyl allyl ether and the like; hydroxyalkyl allyl esters, such as hydroxyethyl allyl ester, hydroxypropyl allyl ester, hydroxybutyl allyl ester, hydroxyisobutyl allyl ester, hydroxycyclohexyl allyl ester and the like; hydroxyalkyl esters of acrylic acid and methacrylic acid, such as 2-hydroxyethyl acrylate, hydroxypropyl acrylate, 2-hydroxyethyl methacrylate, hydroxypropyl methacrylate and the like; partially fluorinated compounds of the above compounds; and the like compounds.

The monomer having hydroxyl group or a group which can be converted into hydroxyl group and a double bond copolymerizable with the fluoroolefins may be utilized singly or as a combination of two or more kinds. Vinyl compounds and allyl compounds are preferable among the examples described above because of copolymerization reactivity with the fluoroolefins.

Examples of a monomer having a carboxyl group are (meth)acrylic acid, carboxyalkyl allyl ether and the like.

Examples of the monomer having glycidyl group are glycidyl (meth)acrylate, glycidyl vinyl ether, glycidyl allyl ether and the like.

As an example of the method utilizing the partial decomposition of copolymer, a monomer having an ester group which can be decomposed after the copolymerization is copolymerized with the fluoroolefin and carboxyl group is formed in the copolymer by hydrolysis of the ester group after the copolymerization.

When a copolymer having ester group is utilized, the copolymer may be utilized directly for curing without the hydrolysis and crosslinked by transesterification.

The flouroresin (a) having a reactive group for crosslinking comprised in the thermosetting powder coating composition of the invention contains 10 weight % or more of fluorine.

The content of fluorine is generally directly related to the composition of the fluoroolefin unit in the flouroresin (a) having the reactive group for crosslinking. However, the content of fluorine can also be varied by polymer reactions after the copolymer has been prepared.

When the content of fluorine in the flouroresin (a) having the reactive group for crosslinking is less than 10 weight %, the coating layer having sufficient weatherability cannot be prepared. The content of fluorine in the flouroresin having the reactive group for crosslinking is preferably in the range from 10 to 72 weight %.

The flouroresin (a) having the reactive group for crosslinking comprised in the thermosetting powder coating composition of the invention has the reactive group for crosslinking and a coating layer having excellent toughness and adhesion can be prepared by the reaction of the reactive group for crosslinking with the hardener. Average molecular weight of the molecular chain of the flouroresin (a) per one reactive group for crosslinking is preferably in the range from 250 to 25000. When the average molecular weight of the molecular chain per one reactive group for crosslinking is more than 25000, the crosslinking is insufficient to cause decrease of the properties like solvent resistance and, when this average molecular weight is less than 250, the density of crosslinking becomes too high to cause decrease of flexibility.

The average molecular weight of the molecular chain of the flouroresin (a) per one reactive group for crosslinking in the invention is a value defined by the following formula:

$$\frac{\text{molecular weight of the fluororesin}}{\text{number of the reactive group for crosslinking in the molecule}}$$

The value defined above can be calculated from a reactive group value for crosslinking (mgKOH/g), such as hydroxyl value, acid value and epoxy equivalent, of the flouroresin by the following equation:

$$\frac{56.1}{\text{reactive group value for crosslinking}} \times 10^3$$

The reactive group value for crosslinking can be measured by infrared spectroscopy, nuclear magnetic resonance spectroscopy and other suitable methods. The number 56.1 in the above equation is the molecular weight of potassium hydroxide.

When the reactive group for crosslinking is an epoxy group, the epoxy equivalent corresponds to the reactive group value for crosslinking.

Hydroxyl value of the fluororesin having a hydroxyl group as the reactive group for crosslinking is preferably in the range from 1 to 200 mgKOH/g and more preferably in the range from 20 to 140 mgKOH/g.

When the hydroxyl value is less than 1 mgKOH/g, the crosslinking is insufficient to cause a decrease in the properties and, when the hydroxyl value is more than 200 mgKOH/g, the density of crosslinking is too high to cause decrease of flexibility.

Acid value of the fluororesin having carboxyl group as the reactive group for crosslinking is preferably in the range from 1 to 200 mgKOH/g and more preferably in the range from 3 to 140 mgKOH/g.

When the acid value is less than 1 mgKOH/g, the crosslinking is insufficient to cause a decrease in the properties and, when the acid value is more than 200 mgKOH/g, the density of crosslinking is too high to cause decrease of flexibility.

Epoxy equivalent of a flouroresin having an epoxy group as the reactive group for crosslinking is preferably in the range from 100 to 5000 g/eq and more preferably in the range from 300 to 14000 g/eq.

When the epoxy equivalent is less than 100 g/eq, crosslinking is insufficient to cause a decrease in the properties and, when the hydroxyl value is more than 15000 g/eq, the density of crosslinking is too high to cause decrease of flexibility.

Other reactive groups for crosslinking in the flouroresin (a) of the invention are amide group, amino group, mercapto group, isocyanate group, active halogen such as bromine and iodine and the like others.

Glass transition temperature of the flouroresin (a) utilized in the invention is in the range from 35° to 120° C. and preferably in the range from 40° to 100° C. When the glass transition temperature is lower than 35° C., the flouroresin is not stable solid and cannot be utilized for the thermosetting powder coating material and, when the glass transition temperature is higher than 120° C., softening point is too high, to cause decrease of flow of the coating layer.

The flouroresin (a) having a reactive group for crosslinking of the invention can be prepared according to conventional methods by polymerizing a mixture of monomers in a specified ratio by the action of a polymerization initiator in the presence or absence of a catalyst. Either solution polymerization, emulsion polymerization or suspension polymerization may be adopted.

When the flouroresin (a) having a reactive group for crosslinking is prepared by emulsion polymerization or suspension polymerization, the dispersion medium is removed from the reaction mixture by vaporization under vacuum of 10 mmHg or lower at a temperature in the range from 50° to 100° C. and the residual mixture is pulverized using a pulverizer, such as a Wiley pulverizer, a vibrating mill pulverizer, an impact hammer mill pulverizer and the like to obtain the flouroresin. When the flouroresin (a) having a reactive group for crosslinking is prepared by the solution polymerization, the flouroresin is separated by removing the solvent by adding the reaction mixture into a solvent in which the flouroresin is insoluble and the separated flouroresin is dried and pulverized to obtain the flouroresin.

The flouroresin (a) having a reactive group for crosslinking comprised in the thermosetting powder coating composition of the invention is utilized in solid form and it is preferred that the content of solvent remaining in the flouroresin, which is measured by the decrease of weight by heating, is 2% or less. The term solvent includes the medium for suspension and is used in the same meaning in other parts of the description as well.

A large amount of solvent remaining in the flouroresin (a) having a reactive group for crosslinking is not desirable because storage stability of the powder coating material is deteriorated and damaged surfaces, such as bubbles, blisters and pin holes, are often found in the coating layer prepared by baking and curing of the powder coating material. It is more preferable that the content of solvent remaining measured by the decease of weight by heating in the flouroresin (a) is 1% or less.

In one aspect of the thermosetting powder coating composition of the invention, it is preferred that 1 to 50 weight %, more preferably 1 to 30 weight %, of the flouroresin (a) is replaced with a resin for thermosetting powder coating material having a reactive group.

Examples of the resin for thermosetting powder coating material are polyester resins, acrylic resins and epoxy resins having either one, two or three of the hydroxyl group, the acid group and the epoxy group.

The polyester resin having a reactive group for crosslinking described above is a solid resin at the room temperature having two or more functional groups in the molecule in average and having the number average molecular weight in the range from 1000 to 20000, preferably in the range from 1500 to 8000. When the functional group is a hydroxyl group, the hydroxyl value is in the range from 10 to 300 mgKOH/g and preferably in the range from 10 to 200 mgKOH/g. When the functional group is carboxyl group, the acid value is in the range from 10 to 300 mgKOH/g and preferably in the range from 10 to 200 mgKOH/g.

The polyester resin can be prepared by direct esterification of a suitable carboxylic acid with a polyfunctional alcohol including ethyleneglycol. Commercial polyesters may be utilized.

Preferable examples of the suitable carboxylic acid described above are terephthalic acid, isophthalic acid, phthalic acid, succinic acid, glutaric acid, adipic acid, sebacic acid, β-oxypropionic acid, oxalic acid, maleic anhydride, trimellitic anhydride, pyromellitic acid and mixtures thereof. Preferable examples of the polyfunctional alcohol described above are ethyleneglycol, propanediol, butanediol, pentanediol, 1,6-hexanediol, neopentyl glycol, 2,2'-diethylpropanediol, cyclohexanediol, trimethylolpropane, pentaerythritol and mixtures thereof.

The acrylic resin having reactive group for crosslinking described above is a solid resin at the room temperature having two or more functional groups in the molecule in average and having the number average molecular weight in the range from 1000 to 20000. When the functional group is a hydroxyl group, the hydroxyl value is in the range from 10 to 300 mgKOH/g and preferably in the range from 10 to 200 mgKOH/g.

When the functional group is a carboxyl group, the acid value is in the range from 10 to 300 mgKOH/g and preferably in the range from 10 to 200 mgKOH/g. When the functional group is epoxy group, the epoxy equivalent is in the range from 200 to 15000 g/eq.

The acrylic resin can be prepared by copolymerization of a copolymerizable vinyl monomer having a hydroxyl group, carboxyl group, glycidyl group, amide group, amino group, mercapto group, isocyanate group or a halogen atom and other copolymerizable vinyl monomers.

Examples of the copolymerizable vinyl monomer having a hydroxyl group are mono(meth)acrylic acid esters and monocrotonic acid esters of polyfunctional alcohols, allyl alcohol, monoallyl ethers of polyfunctional alcohols, hydroxyethyl vinyl ether and the like. Examples of the polyfunctional alcohol which can be utilized for forming the copolymerizable vinyl monomer having hydroxyl group are dihydric alcohols, such as ethylene glycol, polyethylene glycol, propylene glycol, polypropylene glycol, 1,3-butylene glycol, 1,4-butylene glycol, 1,6-hexanediol and the like, glycerine, trimethylolpropane, trimethylolethane, pentaerythritol and the like. Dihydroxyethyl fumarate, butyl hydroxyethyl fumarate and the like may also be utilized as the polyfunctional alcohol.

Examples of the copolymerizable vinyl monomer having a carboxyl group are unsaturated acids having a carboxyl group, such as acrylic acid, methacrylic acid, maleic acid, fumaric acid, itaconic acid and the like.

Examples of the copolymerizable vinyl monomer having an epoxy group are glycidyl acrylate, glycidyl methacrylate, β-methylglycidyl acrylate, β-methylglycidyl methacrylate and the like.

Examples of the other copolymerizable vinyl monomer are alkyl acrylates, such as methyl acrylate, ethyl acrylate, butyl acrylate, 2-ethylhexyl acrylate and the like, alkyl methacrylates, such as methyl methacrylate, ethyl methacrylate, butyl methacrylate, 2-ethylhexyl methacrylate and the like, styrene and derivatives thereof, such as α-methylstyrene and the like, vinyl acetate, vinyl propionate, acrylamide, methacrylamide, acrylonitrile, methacrylonitrile, vinyl stearate, acryl acetate, dialkyl fumarates, dialkyl itaconates, vinyl monomers containing halogen, vinyl monomers containing silicon, ethylene and the like. The other copolymerizable vinyl monomer described above may be utilized singly or as a mixture of two more kinds.

The acrylic resin having a reactive group for crosslinking of the invention can be prepared by copolymerization of the monomers described above in the presence of a conventional polymerization initiator according to conventional methods, such as suspension polymerization and solution polymerization and the like. Commercial acrylic resins may also be utilized.

When the number average molecular weight of the acrylic resin having a reactive group for crosslinking is lower than 1000, the coating layer prepared has insufficient mechanical strength such as impact resistance and flexibility. When the number average molecular weight of the acrylic resin is higher than 20000, the coating layer prepared is inferior in appearance such as smoothness and reflection of images.

The epoxy resin having an epoxy group for crosslinking described above is a bisphenol A type resin having softening point of 40° to 150° C. and having epoxy equivalent between 400 to 6000 g/eq. As these epoxy resins, commercial resins are available, which are produced by Shell Co., Ltd. (Epikote 1001, 1002, 1003, 1003F, 1055, 1004, 1007 and 1009, all trade names), Ciba-Geigy Ltd. (Araldite 6071, 7072, 6084, 6097, 6099, GT7004, XAC5017 and XAC5005, all trade names) and Dow Chemical Ltd. (D.E.R. 671, 640, 662, 642U, 663U, 664, 664U, 667, 668 and 669, all trade names).

When the reactive group in the polyester resin having reactive group for crosslinking or the acrylic resin having reactive group for crosslinking is a hydroxyl group, the hydroxyl value is preferably in the range from 10 to 300 mgKOH/g. When the hydroxyl value is less than 10 mgKOH/g, the crosslinking density is low and the properties of the coating layer is insufficient. When the hydroxyl value is more than 300 mgKOH/g, the coating layer tends to become hard and fragile. When the reactive group in the polyester resin having reactive group for crosslinking or in the acrylic resin having reactive group for crosslinking is a carboxyl group, the acid value is preferably in the range from 10 to 300 mgKOH/g. When the acid value is less than 10 mgKOH/g, the crosslinking density is low and the properties of the coating layer is insufficient. When the acid value is more than 300 mgKOH/g, the coating layer tends to become hard and fragile. When the reactive group in the polyester resin having reactive group for crosslinking or the acrylic resin having reactive group for crosslinking is an epoxy group, the epoxy equivalent is preferably in the range from 200 to 15000 g/eq. When the epoxy equivalent is less than 200 g/eq, the crosslinking density is low and the properties of the coating layer is insufficient. When the epoxy equivalent is more than 15000 g/eq, the coating layer tends to become hard and fragile.

In another aspect of the thermosetting powder coating composition of the invention, it is preferred that 1 to 50 weight %, more preferably 1 to 30 weight %, of the flouroresin (a) is replaced with a thermoplastic resin.

Examples of the such thermoplastic resins are acrylic resins, polyester resins, nylon resins, flouroresins and the like. It is preferable that the resin for thermoplastic powder coating material has a softening point in the range from 60° to 200° C. An example of commercial thermoplastic acrylic resin is Dianal BR-60 ® (a product of Mitsubishi Rayon Co., Ltd.). An example of commercial thermoplastic polyester resin is Vylon 560 ® (a product of Toyo Boseki Co., Ltd.). An example of commercial thermoplastic nylon resin is Orgasol 3502 ® (a product of Nippon Rilsan Co., Ltd.). Examples of commercial thermoplastic flouroresin are Kyner 500 ®, Kyner ADS ® and Kyner SL ® (all products of Pennwalt Chemicals Co.).

As the hardener (b) in the thermosetting powder coating composition of the invention, blocked isocyanate compounds are preferably utilized. Examples of such blocked isocyanate compound are compounds made by blocking the isocyanate group in a isocyanate compound, such as polyisocyanate compounds like isophorone diisocyanate, tolylene diisocyanate, xylylene diisocyanate, 4,4'-diphenylmethane diisocyanate, hexamethylene diisocyanate and the like, dimers and trimers thereof, polyisocyanate compounds made by modifying the above compounds with polyfunctional alcohols like trimethylolpropane, with a blocking agent, such as ε-caprolactam, phenol, benzyl alcohol, methyl ethyl ketoxime and the like.

The blocked isocyanate compounds having solid form at the room temperature are favorably utilized.

Other examples of the hardener utilized in the invention are: aliphatic dibasic acids, such as fumaric acid, succinic acid, adipic acid, azelaic acid, sebacic acid, dodecane diacid and the like; acid anhydrides, such as phthalic anhydride, trimellitic anhydride, pyromellitic anhydride and the like; polyester resins and acrylic resins having the acid value of 10 to 300 mgKOH/g, the glass transition temperature of 30° to 120° C. and the number average molecular weight of 1000 to 15000; dicyandiamide and derivatives thereof; imidazole and derivatives thereof; amine compounds, such as dibasic dihydrazide, diaminophenylmethane, cyclic amidine compounds and the like; melamine resins; glycidyl compounds, such as diglycidyl terephthalate, diglycidyl paraoxybenzoate, triglycidyl isocyanurate, spiroglycol diglycidyl ether, hidantoin compounds, alicyclic epoxy resins and the like; hydroxyl compounds, such as 1,4-bis-2'-hydroxyethoxybenzene, bishydroxyethyl terephthalate, styreneoallyl alcohol copolymers, spiroglycols, tris-2-hydroxyethyl isocyanurate, polyester resins and acrylic resins having hydroxyl value of 10 to 300 mgKOH/g, glass transition temperature of 30° to 120° C. and number average molecular weight of 1000 to 20000; and the like other compounds.

The thermosetting powder coating composition of the invention has the glass transition temperature preferably in the range from 35° to 120° C. and more preferably in the range from 40° to 100° C. When the glass transition temperature is lower than 35° C., the composition is not stable as a solid and sometimes unsuitable for utilizing as thermosetting powder coating composition.

When the glass transition temperature is higher than 120° C., the composition has too high softening point and flow of the coating layer is inferior.

Decrease of the weight of the thermosetting powder coating composition by heating is preferably 2% or less and more preferably 1% or less. The decrease of the weight of the composition of more than 2% is not desirable because the storage stability of the powder coating material is inferior and defects of the surface, such as bubbles, blisters and pin holes, are often found on the coating layer after the powder coating material has been baked and cured.

In the thermosetting powder coating composition of the invention, the resin composition containing (a) 60 to 97 weight % of the flouroresin having reactive group for crosslinking in the molecule and (b) 3 to 40 weight % of the hardener which can form crosslinking by reaction with the reactive group for crosslinking in the flouroresin (a), (c) 0.01 to 10 weight parts of a synthetic wax or a natural wax based on 100 weight parts of the resin composition and (d) 0.001 to 1.0 weight parts of a compound having a coupling group based on 100 weight parts of the resin composition are comprised.

The relative amount of the flouroresin (a) and the hardener (b) can be suitably selected depending on the kind and the relative amount of the reactive group for crosslinking.

To the thermosetting powder coating composition of the invention, other ingredients which are generally added to coating compositions may be compounded additionally. Examples of such additional ingredients are modified resins; inorganic pigments, such as titanium dioxide, iron oxide red, iron oxide yellow, carbon black and the like; organic pigments, such as phthalocyanine green, phthalocyanine blue, quinacridone, isoindolinone and the like; fillers, such as talc, silica, calcium carbonate and the like; metal powders, such as aluminum powder, stainless steel powder and the like; mica powder; levelling agent; ultraviolet absorbent,; heat stabilizer; defoaming agent and the like. These additional ingredients may be added singly or as a combination of two or more kinds.

The composition of the invention can be prepared by mixing the components by the methods generally utilized for preparation of thermosetting powder coating compositions.

The thermosetting composition prepared by the method described above generally has a diameter of 20 to 200 μm or less. The composition is coated uniformly on a substrate, such as iron, aluminum, copper, zinc, alloys of these metals like stainless steel, brass and the like, with a commercial electrostatic powder coating apparatus, a commercial flow dipping apparatus or the like other apparatus, and then cured in a hot air oven, an infrared oven, a dielectric oven or the like apparatus, to form an excellent coating layer.

Thus, by utilizing 0.01 to 10 weight parts of the wax (c) and 0.001 to 1.0 weight parts of the compound having a coupling group (d) based on 100 weight parts of the total of the flouroresin (a) and the hardener (b) in the thermosetting flouroresin powder coating composition, the thermosetting flouroresin powder coating composition having excellent weatherability, acid resistance and adhesion to stainless steel substrate as well as excellent water repellency of coating layer and slipping property of coating layer can be obtained.

DESCRIPTION OF THE PREFERRED EMBODIMENTS

The invention will be understood more readily with reference to the following examples; however, these examples are intended to illustrate the invention and are not to be construed to limit the scope of the invention.

Properties of the coating were evaluated by the following methods.

Acid Resistance

On a test piece, 20% aqueous solution of sulfuric acid was dropped from a pipette for the spot test. Condition of the coating layer was evaluated by visual observation after 200 hours at 20° C.

Results of the evaluation were classified into the following grades;

good: no change was observed poor: change of a large extent, such as blisters and loss of gloss, was observed

Weatherability

Weatherability was evaluated according to the method of Japanese Industrial Standard K-5400 (1990) 9.8.1, accelerated weatherability of sun shine carbon 3-7 light method. Gloss retention and color change after 3000 hours of testing were evaluated according to the method of Japanese Industrial Standard D-0205 7.6.

Results of the evaluation were classified into the following grades:
- good: no change was observed; retention of gloss, 85% or more and difference of color, less than 1.5.
- poor: change of a large extent was observed; retention of gloss, less than 85% and/or difference of color, 1.5 or more.

Appearance

Appearance of the coating layer was evaluated by visual observation of the shape of a fluorescent light reflected from the coating layer and results were classified into the following grades.
- good: image of a fluorescent light on the coating layer was not deformed.
- poor: image of a fluorescent light on the coating layer was deformed.

Adhesive Property

A test plate was immersed in boiling water for 2 hours and then the adhesive property was evaluated according to the lattice method of Japanese Industrial Standard K-5400 (1990) 8.5.1. One hundred lattice pieces were formed on the test plate. Plastic pressure sensitive adhesive tape was pressed to the test plate and then peeled quickly. Number of the lattice piece which remained attached on the stainless steel plate was counted and the adhesive property was evaluated by classifying the number to the following grades:
- good: no peeled piece found (100/100)
- poor: one or more peeled pieces found (0/100~99/100)

Impact Resistance

A test plate was immersed in boiling water for 2 hours and then the impact resistance was evaluated according to the method of Japanese Industrial Standard K 5400 (1990) 8.3.2, Du Pont method.

Results of the evaluation were classified into the following grades:
- good: no change observed at 500 g, 50 cm.
- poor: crack, fracture, peeling and the like observed at 500 g, 50 cm.

Slipping Property of Coating Layer

Static friction coefficient was measured by using the apparatus for measurement of static Friction coefficient HEIDON-10 ® type (manufactured by Shinto Kagaku Co., Ltd.).

Results of the evaluation were classified into the following grades;
- good: 0.15~less than 0.20
- poor: 0.20 or above

Water Repellency of Coating Layer

Evaluated by measurement of the critical surface tension by the contact angle method.

Results of the evaluation were classified into the following grades;
- good: 18~23
- poor: 23 or above

Decrease of Weight by Heating

Decrease of weight by heating was measured according to the method of Japanese Industrial Standard K-5407 (1990) 5.

Example of Preparation of Material 1

Into a stainless steel autoclave of 300 cc inner volume equipped with a stirrer, 157 weight parts of t-butanol, 16 weight parts of cyclohexyl vinyl ether, 9 weight parts of isobutyl vinyl ether, 25 weight parts of hydroxybutyl vinyl ether, 1 weight part of potassium carbonate and 0.07 weight parts of azo-bis-isobutyronitrile (AIBN) were charged and the air dissolved into the components and remaining in the system were removed by freezing with liquid nitrogen.

Then, 50 weight parts of chlorotrifluoroethylene was introduced and the temperature was gradually increased. The reaction was continued under stirring while the temperature was kept at 65° C. After 10 hours, the reaction vessel was cooled with water to stop the reaction. When the reaction mixture was cooled to the room temperature, unreacted monomer was discharged and the reaction vessel was opened.

The reaction system was then heated to 60° C. and the dispersion medium was removed under the vacuum of 1 mmHg in 24 hours. The reaction product was pulverized by an impact hammer mill to obtain a flouroresin having hydroxyl group (A-1) having the hydroxyl value of 120 mgKOH/g, the glass transition temperature of 45° C. and the decrease of weight by heating of 2% or less.

Examples of Preparation of Material 2 to 5

Monomer mixtures shown in Table 1 were polymerized by the same method as in Example of Preparation of Material 1 and flouroresins having reactive group for crosslinking (A-2 to A-5) shown in Table 1 were obtained. The amounts of t-butanol and AIBN were suitably varied according to the condition of every case.

The hydroxyl values, the glass transition temperatures and the decrease of weight by heating of the flouroresins obtained are also listed in Table 1.

TABLE 1

| Example of Preparation of Material | 1 | 2 | 3 | 4 | 5 | 6 |
|---|---|---|---|---|---|---|
| composition of monomer (g) | | | | | | |
| chlorotrifluoroethylene | 50 | 51 | — | 48 | 54 | 53 |
| tetrafluoroethylene | — | — | 45 | — | — | — |
| cyclohexyl vinyl ether | 16 | 28 | 45 | 32 | 23 | 17 |
| ethyl vinyl ether | — | 10 | — | — | 13 | 10 |
| isobutyl vinyl ether | 9 | — | — | — | — | 9 |
| hydroxybutyl vinyl ether | 25 | 11 | 10 | 20 | 5 | 11 |
| vinyl acetate | — | — | — | — | 5 | — |
| total | 100 | 100 | 100 | 100 | 100 | 100 |

TABLE 1-continued

| Example of Preparation of Material | 1 | 2 | 3 | 4 | 5 | 6 |
|---|---|---|---|---|---|---|
| property of polymer | | | | | | |
| fluorine content (weight %) | 24 | 25 | 30 | 22 | 30 | 30 |
| hydroxyl value (mgKOH/g) | 120 | 55 | 50 | 94 | 26 | 46 |
| acid value (mgKOH/g) | — | — | — | — | — | 5 |
| glass transition temperature (°C.) | 45 | 48 | 35 | 50 | 35 | 45 |
| decrease of weight by heating (%) | <2 | <2 | <2 | <2 | <2 | <2 |
| abbreviation for the prepared fluororesin having reactive group for crosslinking | A-1 | A-2 | A-3 | A-4 | A-5 | A-6 |
| average molecular weight between reactive groups for crosslinking of the resin | 468 | 1020 | 1122 | 597 | 2158 | 1100 |

Example of Preparation of Material 6

The monomer mixture shown in Table 1 was polymerized by the same method as in Examples of Preparation of Material 1 to 5 and 100 weight parts of the polymer thus obtained was dissolved in 100 weight parts of xylene. In a four-necked flask equipped with a stirrer, 0.9 weight parts of succinic anhydride and 0.05 weight parts of triethyl benzyl ammonium chloride were added to the solution prepared above and the mixture was heated to 100° C. After heating for 3 hours under stirring, the reaction mixture was cooled. The mixture was heated again to 60° C. and the dispersion medium was removed under vacuum of 1 mmHg in 24 hours. The reaction product thus obtained was pulverized by an impact hammer mill to obtain a flouroresin having hydroxyl group and carboxyl group (A-6).

The hydroxyl value, the acid value, the glass transition temperature and the decrease of weight by heating are shown in Table 1.

Example of Preparation of Material 7

Into a stainless steel autoclave of 300 cc inner volume equipped with a stirrer, 157 weight parts of t-butanol, 18 weight parts of cyclohexyl vinyl ether, 10 weight parts of isobutyl vinyl ether, 20 weight parts of glycidyl vinyl ether, 1 weight part of potassium carbonate and 0.07 weight parts of AIBN were charged and the air dissolved into the components and remaining in the system was removed by freezing with liquid nitrogen. Then, 52 weight parts of chlorotrifluoroethylene was introduced and the temperature was gradually increased. The reaction was continued under stirring while the temperature was kept at 65° C. After 10 hours, the reaction vessel was cooled with water to stop the reaction. When the reaction mixture was cooled to the room temperature, unreacted monomer was discharged and the reaction vessel was opened.

The reaction system was then heated to 60° C. and the dispersion medium was removed under the vacuum of 1 mmHg in 24 hours and the reaction product was pulverized by an impact hammer mill to obtain a flouroresin having glycidyl group (A-7) having the epoxy equivalent of 500 g/eq, the glass transition temperature of 49° C. and the decrease of weight by heating of 2% or less.

Examples of Preparation of Material 8–10

Monomer mixtures shown in Table 2 were polymerized by the same method as in Example of Preparation of Material 1 and flouroresins having glycidyl group (A-8 to A-10) shown in Table 2 were obtained. The amounts of t-butanol and AIBN were suitably varied according to the condition of every case.

The epoxy equivalents, the glass transition temperatures and the decrease of weight by heating of the flouroresins obtained are also listed in Table 2.

TABLE 2

| Example of Preparation of Material | 7 | 8 | 9 | 10 |
|---|---|---|---|---|
| composition of monomer (g) | | | | |
| chlorotrifluoroethylene | 52 | 55 | 48 | 30 |
| tetrafluoroethylene | — | — | — | 21 |
| cyclohexyl vinyl ether | 18 | 35 | 32 | 20 |
| ethyl vinyl ether | — | — | 15 | — |
| isobutyl vinyl ether | 10 | — | — | 14 |
| vinyl acetate | — | — | — | 13 |
| glycidyl vinyl ether | 20 | 10 | — | 2 |
| allyl glycidyl ether | — | — | 5 | — |
| total | 100 | 100 | 100 | 100 |
| property of polymer | | | | |
| fluorine content (weight %) | 29 | 31 | 27 | 33 |
| epoxy equivalent (g/eq) | 500 | 997 | 2180 | 10861 |
| glass transition temperature (°C.) | 49 | 55 | 51 | 37 |
| decrease of weight by heating (%) | <2 | <2 | <2 | <2 |
| abbreviation for the prepared fluororesin having reactive group for crosslinking | A-7 | A-8 | A-9 | A-10 |

Example of Preparation of Material 11

A flouroresin copolymer comprising 52 weight parts of chlorotrifluoroethylene, 28 weight parts of cyclohexyl vinyl ether and 20 weight parts of hydroxybutyl vinyl ether was prepared by the same method as in Example of Preparation of Material 7 and 100 weight parts of the polymer thus obtained was dissolved in 100 weight parts of xylene. In a four-necked flask equipped with a stirrer, 3.6 weight parts of succinic anhydride and 0.05 weight parts of triethyl benzyl ammonium chloride were added to the solution prepared above and the mixture was heated to 100° C. After heating for 3 hours under stirring, the reaction mixture was cooled. The mixture was heated again to 60° C. and the dispersion medium was removed under vacuum of 1 mmHg in 24 hours. The reaction product thus obtained was pulverized by an impact hammer mill to obtain a flouroresin having hydroxyl group and carboxyl group (A-11).

The flouroresin (A-11) had the acid value of 19.5 mgKOH/g, the glass transition temperature of 47° C. and the decrease of weight by heating of 2% or less.

Examples of Preparation of Material 12 to 14

Monomer mixtures shown in Table 3 were polymerized by the same method as in Example of Preparation of Material 11 and succinic anhydride was added to the reaction product to obtain flouroresins having carboxyl group. The amounts of t-butanol and AIBN were suitably varied according to the condition of every case.

The acid values, the glass transition temperatures and the decrease of weight by heating of the flouroresins obtained (A-12 to A-14) are also listed in Table 3.

TABLE 3

| Example of Preparation of Material | 11 | 12 | 13 | 14 |
|---|---|---|---|---|
| composition of monomer (g) | | | | |
| chlorotrifluoroethylene | 52 | 55 | 48 | 51 |
| cyclohexyl vinyl ether | 28 | 15 | — | — |
| ethyl vinyl ether | — | 10 | — | — |
| hydroxybutyl vinyl ether | 20 | — | 15 | 25 |
| isobutyl vinyl ether | — | 5 | 12 | 14 |
| isopropyl vinyl ether | — | 10 | 15 | — |
| vinyl acetate | — | 5 | 10 | — |
| total | 100 | 100 | 100 | 100 |
| modification succinic anhydride (g) | 3.6 | 1.8 | 0.9 | 5.0 |
| property of polymer | | | | |
| fluorine content (weight %) | 29 | 31 | 27 | 29 |
| acid value (mgKOH/g) | 19.5 | 10 | 5 | 26.7 |
| glass transition temperature (°C.) | 47 | 42 | 36 | 37 |
| decrease of weight by heating (%) | <2 | <2 | <2 | <2 |
| abbreviation for the prepared fluororesin having reactive group for crosslinking | A-11 | A-12 | A-13 | A-14 |
| average molecular weight between reactive groups for crosslinking of the resin | 2877 | 5610 | 11220 | 2101 |

Examples 1 to 17 and Comparative Examples 1 to 3

All components in Examples 1 to 17 and Comparative Examples 1 and 2 shown in Tables 4 and 5 were mixed homogeneously for about 1 minute with a dry blender (Hershel mixer ®, a product of Mitsui Kakoki Co., Ltd.) and then melt mixed at 80° to 100° C. with an extruder kneader (Buss Ko-kneader PR46 ®, a product of Buss Co.). The product was cooled and pulverized with an impact hammer mill to fine powder and then screened by a 180 mesh screen to obtain powder coating materials of Examples 1 to 17 and Comparative examples 1 and 2. In Comparative Example 3, Polyflon ® (polytetrafluoroethylene, a product of Daikin Kogyo Co., Ltd.) was used as the flouroresin.

The powder coating materials thus prepared in Examples 1 to 17 and Comparative Examples 1 to 3 were coated with an electrostatic powder coating apparatus on stainless steel plates (SUS 304 HL) of 0.8 mm thickness treated with a hairline process and an alkali degreasing process (by dipping in an aqueous solution of sodium hydroxide at a temperature of 50° C. for 5 minutes, washing with purified water to thoroughly remove the degreasing solution and then drying at the room temperature) to form coating layers of thickness of 50 to 60 μm. The coated pieces were baked at 190° C. for 20 minutes in Examples 1 to 4 and in Comparative Examples 1 and 2, at 250° C. for 5 minutes in Example 5 and at 380° C. for 20 minutes in Comparative Example 3, to obtain test pieces. Properties of the coating layers were evaluated by using the test pieces thus prepared according to the methods described above. Results of the evaluation are shown in Tables 6 and 7.

TABLE 4

| Example | 1 | 2 | 3 | 4 | 5 | 6 | 7 | 8 | 9 | 10 |
|---|---|---|---|---|---|---|---|---|---|---|
| Comparative Example | — | — | — | — | — | — | — | — | — | — |
| composition of coating material | | | | | | | | | | |
| LF-710F[1] | 79.4 | 79.4 | 79.4 | 79.4 | 79.4 | 79.4 | 79.4 | 69.0 | 69.0 | 69.0 |
| fluororesin | | | | | | | | | | |
| A-1 | — | — | — | — | — | — | — | — | — | — |
| A-2 | — | — | — | — | — | — | — | — | — | — |
| A-3 | — | — | — | — | — | — | — | — | — | — |
| A-4 | — | — | — | — | — | — | — | — | — | — |
| A-5 | — | — | — | — | — | — | — | — | — | — |
| A-6 | — | — | — | — | — | — | — | — | — | — |
| Polyflon[2] | — | — | — | — | — | — | — | — | — | — |
| hardener | | | | | | | | | | |
| adduct B-1530[3] | 20.6 | 20.6 | 20.6 | 20.6 | 20.6 | 20.6 | 50.6 | — | — | — |
| adduct B-1065[4] | — | — | — | — | — | — | — | 31.0 | 31.0 | 31.0 |
| adduct BF-1540[5] | — | — | — | — | — | — | — | — | — | — |
| Powderlink 1174[6] | — | — | — | — | — | — | — | — | — | — |
| pigment | | | | | | | | | | |
| Tipure R-960[7] | 45.0 | 45.0 | 45.0 | 45.0 | 45.0 | 45.0 | 45.0 | 45.0 | 45.0 | 45.0 |
| wax | | | | | | | | | | |
| Ceridast 3620[8] | 0.01 | 0.1 | 5.0 | 10.0 | — | — | — | — | — | — |
| Rancowax RE1500F[9] | — | — | — | — | 1.0 | 5.0 | 10.0 | — | — | — |
| Viscol 330P[10] | — | — | — | — | — | — | — | — | — | — |
| coupling agent (weight parts) | | | | | | | | | | |
| TSL-8340[11] | 0.001 | 0.01 | 0.05 | — | — | — | — | — | — | — |
| TSL-8350[12] | — | — | — | 0.03 | 0.09 | 0.50 | 0.90 | — | — | — |
| TSL-8370[13] | — | — | — | — | — | — | — | 0.04 | — | — |
| KR-TTS[14] | — | — | — | — | — | — | — | — | 0.10 | — |
| KR-41B[15] | — | — | — | — | — | — | — | — | — | 0.02 |
| KR-44[16] | — | — | — | — | — | — | — | — | — | — |
| AL-M[17] | — | — | — | — | — | — | — | — | — | 0.03 |

TABLE 5

| Example | 11 | 12 | 13 | 14 | 15 | 16 | 17 | — | — | — |
|---|---|---|---|---|---|---|---|---|---|---|
| Comparative Example | — | — | — | — | — | — | — | 1 | 2 | 3 |
| composition of coating material | | | | | | | | | | |

TABLE 5-continued

| Example | 11 | 12 | 13 | 14 | 15 | 16 | 17 | — | — | — |
|---|---|---|---|---|---|---|---|---|---|---|
| Comparative Example | — | — | — | — | — | — | — | 1 | 2 | 3 |
| fluororesin | | | | | | | | | | |
| LF-710F[1] | — | — | — | — | — | — | — | 79.4 | 79.4 | — |
| A-1 | 62.6 | — | — | — | — | — | — | — | — | — |
| A-2 | — | 78.4 | — | — | — | — | — | — | — | — |
| A-3 | — | — | 80.0 | — | — | — | — | — | — | — |
| A-4 | — | — | — | 68.1 | — | — | — | — | — | — |
| A-5 | — | — | — | — | 88.5 | — | 95.2 | — | — | — |
| A-6 | — | — | — | — | — | 81.3 | — | — | — | — |
| Polyflon[2] | — | — | — | — | — | — | — | — | — | 100.0 |
| hardener | | | | | | | | | | |
| adduct B-1530[3] | 37.4 | 21.6 | 20.0 | 31.9 | 11.5 | — | — | 20.6 | 20.6 | — |
| adduct B-1065[4] | — | — | — | — | — | — | — | — | — | — |
| adduct BF-1540[5] | — | — | — | — | — | 18.7 | — | — | — | — |
| Powderlink 1174[6] | — | — | — | — | — | — | 4.8 | — | — | — |
| pigment | | | | | | | | | | |
| Tipure R-960[7] | 45.0 | 45.0 | 45.0 | 45.0 | 45.0 | 45.0 | 45.0 | 45.0 | 45.0 | — |
| wax | | | | | | | | | | |
| Ceridast 3620[8] | 0.01 | 5.0 | 10.0 | — | 1.0 | — | — | — | 15.0 | — |
| Rankowax RE1500F[9] | — | — | — | — | 1.0 | 5.0 | 10.0 | — | — | — |
| Viscol 330P[10] | — | — | — | 5.0 | — | — | — | — | — | — |
| coupling agent (weight parts) | | | | | | | | | | |
| TSL-8340[11] | — | — | — | — | — | 0.09 | — | — | 2.0 | — |
| TSL-8350[12] | — | — | — | — | — | — | — | — | — | — |
| TSL-8370[13] | — | — | — | — | 0.4 | — | — | — | — | — |
| KR-TTS[14] | — | — | — | 0.1 | — | — | — | — | — | — |
| KR-41B[15] | — | — | 0.7 | 0.03 | — | — | — | — | — | — |
| KR-44[16] | — | 0.7 | — | — | — | — | — | — | — | — |
| AL-M[17] | 0.7 | — | — | — | — | — | 0.02 | — | — | — |

Notes for Tables 4 and 5:
[1] LF-710F ®: a product of Asahi Glass Co., Ltd.; hydroxyl value, 50 mgKOH/g; glass transition temperature, 68° C.; fluorine content, 30%.
[2] Polyflon ®: a product of Daikin Kogyo Co., Ltd; polytetrafluoroethylene, a thermoplastic fluororesin.
[3] Adduct B-1530 ®: a product of Hüls Co.; an ε-caprolactam blocked isophorone diisocyanate; NCO equivalent, 280 g/eq.
[4] Adduct B-1065 ®: a product of Hüls Co.; an ε-caprolactam blocked isophorone diisocyanate; NCO equivalent, 400/g/eq.
[5] Adduct BF-1540 ®: a product of Hüls Co.; an urethodione compound; solid content, 100%; NCO equivalent, 280 g/eq.
[6] Powderlink 1174 ®: a product of Cyanamid Co.; an amino resin hardener; average molecular weight, 350; functional group equivalent, 90–125 g/eq.
[7] Tipure R-960 ®: a product of Du Pont Co.; titanium dioxide.
[8] Ceridast 3620 ®: a product of Höchst Co.; a polyethylene wax; melting point, 125° C.
[9] Rancowax PE1500F ®: a product of Ranger Co.; a polyethylene was; melting point 140° C.
[10] Viscol 330-P ®: a product of Sanyo Kasei Co., Ltd.; a polypropylene wax; melting point, 152° C.
[11] TSL-8340 ®; a product of Toshiba Silicone Co., Ltd.; N-(β-aminoethyl)-γ-aminopropylmethyldimethoxysilane.
[12] TSL-8350 ®; a product of Toshiba Silicone Co., Ltd.; γ-glycidoxypropyltrimethyoxysilane.
[13] TSL-8370 ®; a product of Toshiba Silicone Co., Ltd.; γ-(meth)acryloxypropyltrimethoxysilane.
[14] KR-TTS ®; a product of Ajinomoto Co., Ltd.; a titanate coupling agent containing isopropoxy group.
[15] KR-41B ®; a product of Ajinomoto Co., Ltd.; a titanate coupling agent containing isopropoxy group.
[16] KR-44 ®; a product of Ajinomoto Co., Ltd.; a titanate coupling agent containing isopropoxy group.
[17] KR-44 ®; a product of Ajinomoto Co., Ltd.; acetalkoxyaluminum diisopropylate

TABLE 6

| | Example | | | | | | | | | |
|---|---|---|---|---|---|---|---|---|---|---|
| | 1 | 2 | 3 | 4 | 5 | 6 | 7 | 8 | 9 | 10 |
| | | | | | Comparative Example | | | | | |
| Evaluation | — | — | — | — | — | — | — | — | — | — |
| acid resistance | good | good | good | good | good | good | good | good | good | good |
| weatherability | good | good | good | good | good | good | good | good | good | good |
| adhesive property (number/100) | 100 | 100 | 100 | 100 | 100 | 100 | 100 | 100 | 100 | 100 |
| appearance | good | good | good | good | good | good | good | good | good | good |
| slipping property | 0.18 | 0.17 | 0.17 | 0.15 | 0.18 | 0.17 | 0.17 | 0.18 | 0.16 | 0.15 |
| water repellency | 22.2 | 21.0 | 19.6 | 19.2 | 21.7 | 20.4 | 19.7 | 22.0 | 20.2 | 19.5 |
| impact resistance | good | good | good | good | good | good | good | good | good | good |

TABLE 7

| Evaluation | Example 11 | 12 | 13 | 14 | 15 | 16 | 17 | Comparative Example 1 | 2 | 3 |
|---|---|---|---|---|---|---|---|---|---|---|
| acid resistance | good | good | good | good | good | good | good | good | good | good |
| weatherability | good | good | good | good | good | good | good | good | good | good |
| adhesive property (number/100) | 100 | 100 | 100 | 100 | 100 | 100 | 100 | 0 | 60 | 0 |
| appearance | good | good | good | good | good | good | good | good | poor | poor |
| slipping property | 0.19 | 0.18 | 0.18 | 0.17 | 0.18 | 0.19 | 0.17 | 0.25 | 0.16 | 0.15 |
| water repellency | 22.2 | 21.1 | 19.8 | 19.0 | 21.5 | 21.4 | 19.7 | 34.5 | 19.3 | 18.8 |
| impact resistance | good | good | good | good | good | good | good | poor | poor | poor |

Examples 18 to 31 and Comparative Examples 4 to 7

Examples 18 to 23 show thermosetting powder coating compositions which comprise a flouroresin having glycidyl group (a) and a hardener having carboxyl group (b) and Examples 24 to 31 show thermosetting powder coating compositions which comprise a flouroresin having carboxyl group (a) and a hardener having glycidyl group (b).

All components in Examples 18 to 31 and Comparative Examples 4 to 7 shown in Tables 8 to 10 were mixed homogeneously for about 1 minute with a dry blender (Hershel mixer ®, a product of Mitsui Kakoki Co., Ltd.) and then melt mixed at 80° to 120° C. with an extruder kneader (Buss Ko-kneader PR46 ®, a product of Buss Co.). The product was cooled and pulverized with an impact hammer mill to fine powder and then screened by a 180 mesh screen to obtain powder coating materials of Examples 18 to 31 and Comparative Examples 4 to 7.

The powder coating materials thus prepared in Examples 18 to 31 and Comparative Examples 4 to 7 were coated with an electrostatic powder coating apparatus on stainless steel plates (SUS 304 HL) of 0.8 mm thickness treated with a hairline process and an alkali degreasing process (by dipping in an aqueous solution of sodium hydroxide at a temperature of 50° C. for 5 minutes, washing with purified water to thoroughly remove the degreasing solution and then drying at the room temperature) to form coating layers of thickness of 50 to 60 μm. The coated pieces were baked at 190° C. for 20 minutes to obtain test pieces. Properties of the coating layers were evaluated by using the test pieces thus prepared according to the methods described above. Results of the evaluation are shown in Tables 11 and 12.

TABLE 8

| composition of coating material | Example 18 | 19 | 20 | 21 | 22 | 23 | 24 |
|---|---|---|---|---|---|---|---|
| fluororesin | | | | | | | |
| A-7 | 95.7 | — | 92.0 | — | — | — | — |
| A-8 | — | 79.4 | — | 93.9 | — | — | — |
| A-9 | — | — | — | — | 89.1 | — | — |
| A-10 | — | — | — | — | — | 96.9 | — |
| A-11 | — | — | — | — | — | — | — |
| A-12 | — | — | — | — | — | — | — |
| A-13 | — | — | — | — | — | — | — |
| A-14 | — | — | — | — | — | — | 82.0 |
| hardener | | | | | | | |
| dodecane diacid | — | — | — | — | — | 3.1 | — |
| trimellitic anhydride | — | — | — | 6.1 | — | — | — |
| FINEDIC M-8540[1)] | — | — | — | — | 10.9 | — | — |
| Johncryl 680[2)] | — | 20.6 | — | — | — | — | — |
| dicyandiamide | 4.1 | — | — | — | — | — | — |
| adipic acid dihydrazide | — | — | 8.0 | — | — | — | — |
| Almatex PD 6730[3)] | — | — | — | — | — | — | 18.0 |
| diglycidyl terephthalate | — | — | — | — | — | — | — |
| trigylcidyl isocyanurate | — | — | — | — | — | — | — |
| PRIMID XL-552[4)] | — | — | — | — | — | — | — |
| pigment | | | | | | | |
| Tipure R-960[6)] | 45.0 | 45.0 | 45.0 | 45.0 | 45.0 | 45.0 | 45.0 |
| wax | | | | | | | |
| Ceridast 3620[6)] | 0.01 | 0.1 | 0.1 | 5.0 | 10.0 | 1.0 | 1.0 |
| Rankowax PE1500F[7)] | — | — | — | — | — | 1.0 | — |
| Viscol 330P[8)] | — | — | — | — | — | — | — |
| MPP-230F[9)] | | | | | | | |
| coupling agent (weight part) | | | | | | | |
| TSL-8340[10)] | — | — | 0.03 | — | — | — | — |
| TSL-8350[11)] | — | 0.04 | — | 0.05 | — | — | — |
| TSL-8370[12)] | — | — | — | — | 0.08 | — | — |
| KR-TTS[13)] | 0.04 | — | — | — | — | 0.03 | 0.02 |
| KR-41B[14)] | — | — | — | — | — | — | 0.02 |
| KR-44[15)] | — | 0.01 | — | — | — | — | — |
| AL-M[16)] | — | — | — | — | — | — | — |

TABLE 9

| composition of coating material | Example 25 | 26 | 27 | 28 | 29 | 30 | 31 |
|---|---|---|---|---|---|---|---|
| fluororesin | | | | | | | |
| A-7 | — | — | — | — | — | — | — |
| A-8 | — | — | — | — | — | — | — |
| A-9 | — | — | — | — | — | — | — |
| A-10 | — | — | — | — | — | — | — |
| A-11 | 95.8 | — | — | — | — | — | — |
| A-12 | — | 96.4 | — | — | — | — | — |
| A-13 | — | — | 96.9 | — | — | — | — |
| A-14 | — | — | — | 94.3 | 94.3 | 94.3 | 95.7 |
| hardener | | | | | | | |
| dodecane diacid | — | — | — | — | — | — | — |
| trimellitic anhydride | — | — | — | — | — | — | — |
| FINEDIC M-8540[1)] | — | — | — | — | — | — | — |
| Johncryl 680[2)] | — | — | — | — | — | — | — |
| dicyandiamide | — | — | — | — | — | — | — |
| adipic acid dihydrazide | — | — | — | — | — | — | — |
| Almatex PD 6730[3)] | — | — | — | — | — | — | — |
| diglycidyl terephthalate | — | 3.6 | 3.1 | — | — | — | — |
| trigylcidyl isocyanurate | 4.2 | — | — | 5.7 | 5.7 | 5.7 | — |
| PRIMID XL-552[4)] | — | — | — | — | — | — | 4.3 |
| pigment | | | | | | | |
| Tipure R-960[5)] | 45.0 | — | 45.0 | 45.0 | 45.0 | 45.0 | 45.0 |
| wax | | | | | | | |
| Ceridast 3620[6)] | — | — | — | — | — | — | — |
| Rankowax PE1500F[7)] | 5.0 | 10.0 | — | — | — | — | 10.0 |
| Viscol 330P[8)] | — | — | 1.0 | 5.0 | 10.0 | — | — |
| MPP-230F[9)] | — | — | — | — | — | 1.0 | — |

TABLE 9-continued

| composition of coating material | Example | | | | | | |
|---|---|---|---|---|---|---|---|
| | 25 | 26 | 27 | 28 | 29 | 30 | 31 |
| coupling agent (weight part) | | | | | | | |
| TSL-8340[10] | 0.01 | 0.7 | 0.1 | 0.1 | 0.7 | 0.1 | 0.1 |
| TSL-8350[11] | — | — | — | — | — | — | — |
| TSL-8370[12] | 0.03 | — | — | — | — | — | — |
| KR-TTS[13] | — | — | — | — | — | — | — |
| KR-41B[14] | — | — | — | — | — | — | — |
| KR-44[15] | — | — | — | — | — | — | — |
| AL-M[16] | — | — | — | — | — | — | — |

TABLE 10

| composition of coating material | Example | | | |
|---|---|---|---|---|
| | 4 | 5 | 6 | 7 |
| fluororesin | | | | |
| A-7 | 95.9 | — | — | — |
| A-8 | — | — | — | — |
| A-9 | — | 89.1 | — | — |
| A-10 | — | — | — | — |
| A-11 | — | — | — | — |
| A-12 | — | — | 96.4 | — |
| A-13 | — | — | — | — |
| A-14 | — | — | — | 94.3 |
| hardener | | | | |
| dodecane diacid | — | — | — | — |
| trimellitic anhydride | — | — | — | — |
| FINEDIC M-8540[1] | — | 10.9 | — | — |
| Johncryl 680[2] | — | — | — | — |
| dicyandiamide | 4.1 | — | — | — |
| adipic acid dihydrazide | — | — | — | — |
| Almatex PD 6730[3] | — | — | — | — |
| diglycidyl terephthalate | — | — | 3.6 | — |
| trigylcidyl isocyanurate | — | — | — | 5.7 |
| PRIMID XL-552[4] | — | — | — | — |
| pigment | | | | |
| Tipure R-960[5] | 45.0 | — | 45.0 | 45.0 |
| wax | | | | |
| Ceridast 3620[6] | — | 5.0 | — | — |
| Rankowax PE1500F[7] | — | — | 5.0 | 5.0 |
| Viscol 330P[8] | — | — | — | — |
| MPP-230F[9] | — | — | — | — |
| coupling agent | | | | |

TABLE 10-continued

| composition of coating material | Example | | | |
|---|---|---|---|---|
| | 4 | 5 | 6 | 7 |
| (weight part) | | | | |
| TSL-230F[10] | — | — | 0.0007 | 2.0 |
| TSL-8340[11] | — | — | — | — |
| TSL-8350[12] | 0.5 | — | — | — |
| KR-TTS[13] | — | — | — | — |
| KR-41B[14] | — | — | — | — |
| KR-44[15] | — | — | — | — |
| AL-M[16] | — | — | — | — |

Notes for Tables 8, 9 and 10:
[1] FINEDIC M-8540 ®: a product of Dainippon Ink Kagaku Kogyo C., Ltd.; a polyester resin; acid value, 220 mgKOH/g; number average molecular weight, 1900.
[2] Johncryl 680 ®: a product of Johnson Wax Co.; an acrylic resin; acid value, 215 mgKOH/g; number average molecular weight, 1800.
[3] Almatex PD-6730 ®: a product of Mitsui Toatsu Co., Ltd.; an acrylic resin; epoxy equivalent, 460 g/eq; number average molecular weight, 3300.
[4] PRIMID XL-552 ®: a product of the Rohm and Haas Co.; a β-hydroxyalkyl amide.
[5] Tipure R-960 ®: a product of Du Pont Co.; titanium dioxide.
[6] Ceridast 3620 ®: a product of Höchst Co.; a polyethylene wax; melting point, 125° C.
[7] Rancowax PE1500F ®: a product of Rangar Co.; a polyethylene wax; melting point 140° C.
[8] Viscol 330-P ®: a product of Sanyo Kasei Co., Ltd.; a polypropylene wax; melting point, 152° C.
[9] MPP-230F ®: a product of Micro Powder Co.; a polyethylene wax; melting point, 245° C.
[10] TSL-230F ®; a product of Toshiba Silicone Co., Ltd.; N-(β-aminoethyl)-γ-aminopropylmethyldimethoxysilane.
[11] TSL-8370 ®; a product of Toshiba Silicone Co., Ltd.; γ-glycidoxypropyltrimethoxysilane.
[12] TSL-8350 ®; a product of Toshiba Silicone Co., Ltd.; g-(meth)acryloxypropyltrimethoxysilane.
[13] KR-TTS ®; a product of Ajinomoto Co., Ltd.; a titanate coupling agent containing isopropoxy group.
[14] KR-41B ®; a product of Ajinomoto Co., Ltd.; a titanate coupling agent containing isopropoxy group.
[15] KR-44 ®; a product of Ajinomoto Co., Ltd.; a titanate coupling agent containing isopropoxy group.
[16] AL-M ®; a product of Ajinomoto Co., Ltd.; acetalkoxyaluminum diisopropylate

TABLE 11

| Example | 18 | 19 | 20 | 21 | 22 | 23 | 24 | 25 | 26 |
|---|---|---|---|---|---|---|---|---|---|
| Comparative example | — | — | — | — | — | — | — | — | — |
| Evaluation | | | | | | | | | |
| acid resistance | good | good | good | good | good | good | good | good | good |
| weatherability | good | good | good | good | good | good | good | good | good |
| adhesive property (number/100) | 100 | 100 | 100 | 100 | 100 | 100 | 100 | 100 | 100 |
| appearance | good | good | good | good | good | good | good | good | good |
| slipping property | 0.19 | 0.18 | 0.19 | 0.18 | 0.19 | 0.18 | 0.17 | 0.18 | 0.17 |
| water repellency | 22.4 | 22.2 | 22.0 | 20.6 | 19.2 | 21.7 | 20.7 | 20.5 | 18.7 |
| impact resistance | good | good | good | good | good | good | good | good | good |

TABLE 12

| Example | 27 | 28 | 29 | 30 | 31 | — | — | — | — |
|---|---|---|---|---|---|---|---|---|---|
| Comparative example | — | — | — | — | — | 4 | 5 | 6 | 7 |
| Evaluation | | | | | | | | | |
| acid resistance | good | good | good | good | good | good | good | good | good |
| weatherability | good | good | good | good | good | good | good | poor | good |
| adhesive property (number/100) | 100 | 100 | 100 | 100 | 100 | 100 | 0 | 25 | 100 |
| appearance | good | good | good | good | good | good | good | good | poor |
| slipping property | 0.18 | 0.18 | 0.17 | 0.19 | 0.17 | 0.26 | 0.18 | 0.19 | 0.19 |
| water repellency | 21.8 | 19.8 | 19.7 | 20.3 | 19.7 | 34.5 | 21.8 | 20.3 | 20.3 |
| impact resistance | good | good | good | good | good | good | poor | poor | good |

Examples 32 to 42 and Comparative Examples 8 to 12

In Examples 32 to 36, 1 to 50 weight % of the flouroresin (a) in the thermosetting powder coating compositions were replaced with other resins for thermosetting powder coating material having the same kind of reactive group for crosslinking as the flouroresin (a). In Examples 37 to 42, 1 to 50 weight % of the flouroresins (a) in the thermosetting powder coating compositions were replaced with other resins for thermoplastic powder coating material having the same kind of reactive group for crosslinking as the flouroresin.

All components in Examples 32 to 42 and Comparative Examples 8 to 12 shown in Tables 13 and 14 were mixed homogeneously for about 1 minute with a dry blender (Hershel mixer ®, a product of Mitsui Kakoki Co., Ltd.) and then melt mixed at 80° to 120° C. with an extruder kneader (Buss Ko-kneader PR46 ®, a product of Buss Co.). The product was cooled and pulverized with an impact hammer mill to fine powder and then screened by a 180 mesh screen to obtain powder coating materials of Examples 32 to 42 and Comparative Examples 8 to 12.

The powder coating materials of Examples 32 to 42 and Comparative Examples 8 to 12 thus prepared were coated with an electrostatic powder coating apparatus on stainless steel plates (SUS 304 HL) of 0.8 mm thickness treated with a hairline process and an alkali degreasing process (by dipping in an aqueous solution of sodium hydroxide at a temperature of 50° C. for 5 minutes, washing with purified water to thoroughly remove the degreasing solution and then drying at the room temperature) to form coating layers of thickness of 50 to 60 μm. The coated pieces were baked at 190° C. for 20 minutes to obtain test pieces. Properties of the coating layers were evaluated by using the test pieces thus prepared according to the methods described above. Results of the evaluation are shown in Tables 15 and 16.

TABLE 13

| Example | | 32 | 33 | 34 | 35 | 36 | 37 | 42 |
|---|---|---|---|---|---|---|---|---|
| Comparative example | | — | — | — | — | — | — | — |
| composition of coating material | | | | | | | | |
| fluororesin | LF-710F[1)] | 50.0 | 60.0 | — | — | — | — | 74.4 |
| | A-7 | — | — | 90.0 | — | — | — | — |
| | A-10 | — | — | — | — | — | — | — |
| | A-11 | — | — | — | 80.0 | — | — | — |
| | A-14 | — | — | — | — | 90.0 | — | — |
| thermosetting coating resin | Almatex AP-3304[3)] | 29.0 | — | — | — | — | — | — |
| | FINEDIC A-207S[4)] | — | — | 5.9 | — | — | — | — |
| | Almatex AP3299[5)] | — | — | — | 15.8 | — | — | — |
| | Ester Resin ER6650[6)] | — | 19.4 | — | — | — | — | — |
| | Uralak P-3500[7)] | — | — | — | — | 4.3 | — | — |
| thermoplastic coating resin | Dianal BR-60[8)] | — | — | — | — | — | 10.0 | — |
| | Vylon 560[9)] | — | — | — | — | — | — | — |
| | Orgasol 3502[10)] | — | — | — | — | — | — | — |
| | Kyner 500[11)] | — | — | — | — | — | — | — |
| | Kyner ADS[12)] | — | — | — | — | — | — | 20.0 |
| hardener | Adduct B-1530[2)] | 20.6 | 20.6 | — | — | — | 20.6 | 20.6 |
| | dicyandiamide | — | — | 4.1 | — | — | — | — |
| | dodecane diacid | — | — | — | — | — | — | — |
| | triglycidyl isocyanurate | — | — | — | 4.2 | 5.7 | — | — |
| pigment | Tipure R-960[13)] | 20.0 | 20.0 | 20.0 | 20.0 | 20.0 | 20.0 | 20.0 |
| wax | Ceridast 3620[14)] | 0.5 | 0.5 | 0.5 | — | — | — | 0.8 |
| | Ranko wax PE1500F[15)] | — | — | — | 0.5 | 0.5 | 0.5 | — |
| | Viscol 330P[16)] | — | — | — | — | — | — | — |
| coupling agent (weight part) | TSL-8340[17)] | 0.2 | — | — | — | — | — | — |
| | TSL-8350[18)] | — | 0.2 | — | — | — | — | — |
| | TSL-8370[19)] | — | — | 0.2 | — | — | — | — |
| | KR-TTS[20)] | — | — | — | 0.2 | — | — | — |
| | KR-41B[21)] | — | — | — | — | 0.2 | — | — |
| | KR-44[22)] | — | — | — | — | — | 0.2 | — |
| | AL-M[23)] | — | — | — | — | — | — | 0.8 |

TABLE 14

| Example | | 38 | 39 | 40 | 41 | — | — | — | — | — |
|---|---|---|---|---|---|---|---|---|---|---|
| Comparative example | | — | — | — | — | 8 | 9 | 10 | 11 | 12 |
| composition of coating material | | | | | | | | | | |
| fluororesin | LF-710F[1)] | 74.4 | — | — | — | — | — | — | — | 74.4 |
| | A-7 | — | — | — | — | 44.1 | — | — | — | — |
| | A-10 | — | 81.9 | — | — | — | 46.9 | 46.9 | — | — |
| | A-11 | — | — | 90.8 | 75.8 | — | — | — | 90.8 | — |
| | A-14 | — | — | — | — | — | — | — | — | — |
| thermosetting coating resin | Almatex AP-3304[3)] | — | — | — | — | — | — | — | — | — |
| | FINEDIC A-207S[4)] | — | — | — | — | 51.8 | — | — | — | — |
| | Almatex AP3299[5)] | — | — | — | — | — | — | — | — | — |
| | Ester Resin ER6650[6)] | — | — | — | — | — | — | — | — | — |
| | Uralak P-3500[7)] | — | — | — | — | — | — | — | — | — |
| thermoplastic coating resin | Dianal BR-60[8)] | — | — | — | — | — | 50.0 | 50.0 | — | — |
| | Vylon 560[9)] | 5.0 | — | — | — | — | — | — | — | — |
| | Orgasol 3502[10)] | — | 15.0 | — | — | — | — | — | — | — |
| | Kyner 500[11)] | — | — | 5.0 | 20.0 | — | — | — | — | — |
| | Kyner ADS[12)] | — | — | — | — | — | — | — | 5.0 | — |
| hardener | Adduct B-1530[2)] | — | — | — | — | 4.1 | — | — | — | 20.6 |
| | dicyandiamide | — | — | — | — | — | — | — | — | — |

TABLE 14-continued

| Example | | 38 | 39 | 40 | 41 | — | — | — | — | — |
|---|---|---|---|---|---|---|---|---|---|---|
| Comparative example | | — | — | — | — | 8 | 9 | 10 | 11 | 12 |
| | dodecane diacid | — | 3.1 | — | — | — | 3.1 | 3.1 | — | — |
| | triglycidyl isocyanurate | — | — | 4.2 | 4.2 | — | — | — | 4.2 | — |
| pigment | Tipure R-960[13] | 20.0 | 20.0 | 20.0 | 20.0 | 20.0 | 20.0 | 20.0 | 20.0 | — |
| wax | Ceridast 3620[14] | — | — | — | — | — | — | — | 0.005 | 5.0 |
| | Rankowax PE1500F[15] | — | — | — | — | — | — | — | — | — |
| | Viscol 330P[16] | 0.5 | 0.5 | 0.5 | 0.5 | 0.5 | 0.5 | 0.5 | — | — |
| coupling | TSL-8340[17] | — | — | — | — | — | — | — | — | — |
| agent | TSL-8350[18] | — | — | — | — | — | — | — | — | — |
| (weight | TSL-8370[19] | — | 0.5 | 0.5 | 0.5 | — | — | 0.5 | 0.5 | — |
| part) | KR-TTS[20] | — | — | — | — | — | — | — | — | 1.2 |
| | KR-41B[21] | — | — | — | — | — | — | — | — | — |
| | KR-44[22] | — | — | — | — | — | — | — | — | — |
| | AL-M[23] | 0.5 | — | — | — | — | — | — | — | — |

Notes for Tables 13 and 14:
[1] LF-710F ®: a product of Asahi Glass Co., Ltd.; hydroxyl value, 50 mg KOH/g; glass transition temperature, 68° C.; fluorine content, 30%.
[2] Adduct B-1530 ®: a product of Huls Co.; an ε-caprolactam blocked isophorone diisocyanate; NCO equivalent, 280 g/eq.
[3] Almatex AP-3304 ®: a product of Mitsui Toatsu Co., Ltd.; an acrylic resin; hydroxyl value, 50 mg KOH/g; number average molecular weight, 3000.
[4] FINEDIC A-207S ®: a product of Dainippon Ink Kagaku Kogyo Co., Ltd.; an acrylic resin; epoxy equivalent, 508 g/eq; number average molecular weight, 3500.
[5] Almatex AP-3299 ®: a product of Mitsui Toatsu Co., Ltd.; acid value, 33 mg KOH/g; number average molecular weight 3300.
[6] Ester Rein ER-6650 ®: a product of Nippon Ester Co., Ltd.; a polyester resin; hydroxyl value, 30 mg KOH/g; number average molecular weight, 4100.
[7] Uralack P-3500 ®: a product of Yubika DSM Resins Co., Ltd.; a polyester resin; acid value, 33~38 mg KOH/g; number average molecular weight, 2900.
[8] Dianal BR-60 ®: a product of Mitsubishi Rayon Co., Ltd.; a thermoplastic acrylic resin; softening point, 100 to 140° C.
[10] Vylon 560 ®: a product of Toyo Boseki Col, Ltd.; a thermoplastic polyester resin; softening point, 110° C.
[11] Orgasol 3502 ®: a product of Nippon Rilsan Co., Ltd.; a nylon powder; softening point 135~160° C.
[11] Kyner 500 ®: a product of Pennwalt Chemicals Co.; polyvinylidene fluoride; softening point, 160~170° C.
[12] Kyner ADS ®: a product of Pennwalt Chemicals Co.; softening point 76° C.
[13] Tipure R-960 ®: a product of Du Pont Co.; titanium dioxide.
[14] Ceridast 3620 ®: a product of Hochst Co.; a polyethylene wax; melting point, 125° C.
[15] Rancowax PE1500F ®: a product of Rangar Co.; a polyethylene wax; melting point 140° C.
[16] Viscol 330-P ®: a product of Sanyo Kasei Co., Ltd.; a polypropylene wax; melting point, 152° C.
[17] TSL-8340 ®; a product of Toshiba Silicone Co., Ltd.; N-(β-aminoethyl)-γ-aminopropylmethyldimethoxysilane.
[18] TSL-8350 ®; a product of Toshiba Silicone Co., Ltd.; γ-glycidoxypropyltrimethoxysilane.
[19] TSL-8370 ®; a product of Toshiba Silicone Co., Ltd.; g-(meth)acryloxypropyltrimethoxysilane.
[20] KR-TTS ®; a product of Ajinomoto Co., Ltd.; a titanate coupling agent containing isopropoxy group.
[21] KR-41B ®; a product of Ajinomoto Co., Ltd.; a titanate coupling agent containing isopropoxy group.
[22] KR-44 ®; a product of Ajinomoto Co., Ltd.; a titanate coupling agent containing isopropoxy group.
[23] AL-M ®; a product of Ajinomoto Co., Ltd.; acetalkoxyaluminum diisopropylate

TABLE 15

| Example | 32 | 33 | 34 | 35 | 36 | 37 | 42 |
|---|---|---|---|---|---|---|---|
| Comparative example | — | — | — | — | — | | |
| Evaluation | | | | | | | |
| acid resistance | good | good | good | good | good | good | good |
| weatherability | good | good | good | good | good | good | good |
| adhesive property (number/100) | 100 | 100 | 100 | 100 | 100 | 100 | 100 |
| appearance | good | good | good | good | good | good | good |
| slipping property | 0.19 | 0.19 | 0.18 | 0.18 | 0.18 | 0.19 | 0.18 |
| water repellency | 21.2 | 22.2 | 19.6 | 20.2 | 19.7 | 19.4 | 19.4 |
| impact resistance | good | good | good | good | good | good | good |

TABLE 16

| Example | 38 | 39 | 40 | 41 | — | — | — | — | — |
|---|---|---|---|---|---|---|---|---|---|
| Comparative example | — | — | — | — | 8 | 9 | 10 | 11 | 12 |
| Evaluation | | | | | | | | | |
| acid resistance | good | good | good | good | good | good | good | good | good |
| weatherability | good | good | good | good | poor | poor | poor | good | good |
| adhesive property (number/100) | 100 | 100 | 100 | 100 | 50 | 80 | 100 | 100 | 100 |
| appearance | good | good | good | good | good | poor | poor | good | poor |
| slipping property | 0.19 | 0.18 | 0.17 | 0.16 | 0.19 | 0.19 | 0.20 | 0.22 | 0.17 |
| water repellency | 19.7 | 19.7 | 18.5 | 18.2 | 22.4 | 22.9 | 23.0 | 25.0 | 19.7 |
| impact resistance | good | good | good | good | poor | poor | good | good | poor |

As the results in Tables 6, 7, 11, 12, 15 and 16 show, it can be understood that the thermosetting flouroresin powder coating compositions of Examples 1 to 42 have decreased static friction coefficient and critical surface tension while the weatherability, the acid resistance and the adhesive property were retained and have the same degree of the water repellency of coating layer and the slipping property of coating layer as polytetrafluoroethylene. It is also understood that they are thermosetting flouroresin powder coating compositions having excellent adhesion to stainless steel plate and impact resistance after the test in boiling water which are so called secondary adhesion and secondary physical properties of the coating layer.

In contrast, the thermosetting powder coating composition of Comparative Examples 1, 4 and 11 in which insufficient amounts of wax were added had inferior slipping property of coating layer and water repellency of coating layer. The thermosetting powder coating composition of Comparative Example 2 in which more than 10 weight parts of wax was used had inferior adhesive property and appearance.

The thermosetting powder compositions of Comparative Examples 1, 5, 6, 8 and 9 had inferior adhesion and impact resistance. The thermosetting powder compositions of Comparative Examples 2 and 7 in which more than 1.0 weight part of the coupling agent was used had inferior appearance. The thermosetting powder composition of Comparative Example 12 had inferior appearance and impact resistance of the coating layer.

The thermosetting powder coating composition of Comparative Example 3 in which polytetrafluoroethylene resin was used had inferior adhesive property and impact resistance.

The thermosetting powder coating compositions of Comparative Example 8 in which more than 50 weight % of thermosetting powder coating resin having reactive group for crosslinking was used had inferior adhesive property and weatherability.

The thermosetting powder coating composition of Comparative Examples 9 had inferior weatherability, adhesive property, appearance and impact resistance and the thermosetting powder coating composition of Comparative Example 10 had inferior weatherability, appearance, slipping property of the coating layer and water repellency of the coating layer.

While the invention has been particularly shown and described with reference to preferred embodiments thereof, it will be understood by those skilled in the art that the foregoing and other changes in form and details can be made therein without departing from the spirit and scope of the invention.

To summarize the advantages obtained by the invention, the coating layer formed from the thermosetting flouroresin powder coating composition of the invention has the same degree of water repellency of coating layer and slipping property of coating layer as those of the coating layer formed from polytetrafluoroethylene resin which is a thermoplastic flouroresin while the excellent weatherability, acid resistance and adhesion to substrates are retained. Furthermore, coating layer having excellent adhesive property and impact resistance can be formed on stainless steel substrate without chemical pretreatment or coating with a primer. Thus, the thermosetting flouroresin powder composition of the invention is useful in industrial applications.

What is claimed is:

1. A thermosetting powder coating composition comprising a resin composition containing (a) 60 to 97 weight % of a flouroresin having reactive group for crosslinking in the molecule which contains 10 weight % or more of fluorine and has glass transition temperature in the range from 35° to 120° C., (b) 3 to 40 weight % of a hardener which can form crosslinking by reaction with the reactive group for crosslinking in the flouroresin (a), (c) 0.01 to 10 weight parts of a synthetic wax or a natural wax based on 100 weight parts of the resin composition and (d) 0.001 to 1.0 weight parts of a material as a coupling agent based on 100 weight parts of the resin composition.

2. A thermosetting powder coating composition as claimed in claim 1, wherein the decrease of weight by heating of the flouroresin (a) is 2% or less.

3. A thermosetting powder coating composition as claimed in claim 1, wherein the flouroresin (a) has a hydroxyl value in the range from 1 to 200 mgKOH/g.

4. A thermosetting powder coating composition as claimed in claim 1, wherein the flouroresin (a) has an acid value in the range from 1 to 200 mgKOH/g.

5. A thermosetting powder coating composition as claimed in claim 1, wherein the flouroresin (a) has an epoxy equivalent in the range from 100 to 15000 g/eq.

6. A thermosetting powder coating composition as claimed in claim 1, wherein the synthetic wax or the natural wax (c) has a melting point in the range from 50° to 280° C.

7. A thermosetting powder coating composition comprising a resin composition containing (a) 60 to 97 weight % of a component comprising (i) a fluororesin and (ii) a resin for thermosetting powder coating material, wherein the fluororesin has a reactive group for crosslinking in the molecule, contains 10 weight % or more of fluorine, has glass transition temperature in the range from 35° to 120° C. and is present in an amount of 99 to 50 weight % based on the total of (i) and (ii) and the resin has a reactive group and is present in an amount of 1 to 50 weight % based on the total of (i) and (ii), (b) 3 to 40 weight % of a hardener which can form crosslinking by reaction with the reactive group for crosslinking in the fluororesin (i) of (a), (c) 0.01 to 10 weight parts of a synthetic wax or a natural wax based on 100 weight parts of the resin composition and (d) 0.001 to 1.0 weight parts of a material as a coupling agent based on 100 weight parts of the resin composition.

8. A thermosetting powder coating composition as claimed in claim 7, wherein the resin for thermosetting powder coating material is a polyester resin, an acrylic resin or an epoxy resin having one, two or three reaction groups selected from the group consisting of hydroxyl, acid and epoxy groups.

9. A thermosetting powder coating composition comprising a resin composition containing (a) 60 to 97 weight % of a component comprising (i) a fluororesin and (ii) a thermoplastic resin, wherein the fluororesin has a reactive group for crosslinking in the molecule, contains 10 weight % or more of fluorine, has a glass transition temperature in the range from 35° to 120° C. and is present in an amount of 99 to 50 weight % based on the total of (i) and (ii) and the thermoplastic resin is present in an amount of 1 to 50 weight % based on the total of (i) and (ii), (b) 3 to 40 weight % of a hardener which can form crosslinking by reaction with the reactive group for crosslinking in the fluororesin of (a), (c) 0.01 to 10 weight parts of a synthetic wax or a natural wax based on 100 weight parts of the resin composition and (d) 0.001 to 1.0 weight parts of a material as a coupling agent based on 100 weight parts of the resin composition.

10. A thermosetting powder coating composition as claimed in claim 9, wherein the resin for thermoplastic coating material is an acrylic resin, a polyester resin, a nylon resin or a fluororesin having softening point of 60° to 200° C.

11. A thermosetting powder coating composition as claimed in claim 1, wherein the fluororesin of (a) has a glass transition temperature in the range from 40° to 100° C. and the decrease of weight thereof by heating is 1% or less.

12. A thermosetting powder coating composition as claimed in claim 1, wherein the fluororesin of (a) has a hydroxyl value in the range from 20 to 140 mgKOH/g.

13. A thermosetting powder coating composition as claimed in claim 1, wherein the fluororesin of (a) has an acid value in the range from 3 to 140 mgKOH/g.

14. A thermosetting powder coating composition as claimed in claim 1, wherein the fluororesin of (a) has an epoxy equivalent in the range from 300 to 14000 g/eq.

15. A thermosetting powder coating composition as claimed in claim 7, wherein the resin (ii) is an epoxy resin.

16. A thermosetting powder coating composition as claimed in claim 7, wherein the resin (ii) is a bisphenol A type resin epoxy resin having a softening point of 40° to 150° C. and an epoxy equivalent between 400 to 6000 g/eq.

* * * * *